United States Patent [19]
MacKenzie et al.

[11] 3,882,881
[45] May 13, 1975

[54] PNEUMATIC TRANSMITTER OF ELECTRICAL PHENOMENA

[75] Inventors: Donald D. MacKenzie, Middlebury; John L. Russell, Waterbury, both of Conn.

[73] Assignee: American Chain & Cable Company, Inc., Bridgeport, Conn.

[22] Filed: Jan. 12, 1973

[21] Appl. No.: 323,284

[52] U.S. Cl. .................. 137/14; 137/85; 236/84
[51] Int. Cl. .................. G05d 10/16; G05d 23/22
[58] Field of Search ....... 137/82, 85, 101.21, 487.5, 137/499, 14; 236/84

[56] References Cited
UNITED STATES PATENTS

| | | | |
|---|---|---|---|
| 3,038,486 | 6/1962 | Thurman | 137/101.21 X |
| 3,070,111 | 12/1902 | Owens | 137/101.21 |
| 3,279,496 | 10/1966 | Klass | 137/499 X |
| 3,575,642 | 4/1971 | Puster | 137/85 X |

*Primary Examiner*—Allan Cohan
*Attorney, Agent, or Firm*—Pennie & Edmonds

[57] ABSTRACT

A self contained system for converting an electrical representation of a sensed environmental condition to a fluid signal by modulating the pressure of a fluid. A source of fluid under pressure drives a turbine motor which converts the energy of the pressurized fluid to rotational energy in the form of a spinning turbine shaft. The turbine shaft in turn drives the rotor of an AC generator. The AC output of the generator is rectified and regulated to form a constant DC voltage source for generating a DC current which is modulated electronically in accordance with the electrical representation of the sensed condition and is applied to a force coil which is mounted on a movable force bar. The coil is positioned such that current flow therethrough will induce a flux field which co-acts with a permanent magnet to attract the force bar toward the magnet with a force that depends on the level of current in the winding. At the same time, fluid pressure is channelled to a readout or utilization device, which may be located remotely. This pressure is applied to a feedback bellows which serves to establish the proportionality between fluid pressure and the current in the coil and therefore with the environmental condition being sensed.

15 Claims, 8 Drawing Figures

PNEUMATIC TRANSMITTER OF ELECTRICAL PHENOMENA

BACKGROUND OF THE INVENTION

This invention relates to a self contained fluid pressure system for sensing environmental conditions and more specifically is directed to such a system wherein the sensed environmental condition is represented by an electrical signal which is converted to a fluid signal.

In many present day applications it is desirable to measure environmental conditions such as temperature, humidity, and pressure in isolated areas where the necessary electrical energy for making such measurements is not readily available. Thus, for example, along gas pipe lines it is often desirable to measure the temperature or pressure of the fluid passing through the pipe line. Electrical energy is usually not available in the isolated areas through which the lines pass except by means of batteries which only operate on a short term basis. In order to provide a continuous monitoring of physical conditions in such isolated areas, a new method of measuring the conditions must be provided wherein the measuring device is capable of months and even years of continuous operation in an environment that is often wet, oily, dirty and corrosive. In addition, the monitoring of volatile fluids is often very dangerous because of the possibility that a hot component or an electrical line having a high voltage thereon might ignite the fluid and thereby cause an explosion. Accordingly, the means for measuring the physical condition should have a minimum of electrical leads extending therefrom and preferably should be self contained within a single enclosure so as to minimize the possibility of exposing components thereof to the surrounding environment. Further, the means for measuring the physical conditions should be characterized as being not only highly efficient but also very accurate. Preferably the measuring means should be capable of controlling a response mechanism for adjusting or controlling the environment measured.

It, therefore, is an object of this invention to provide a method and apparatus for utilizing a fluid under pressure for measuring one or more environmental conditions.

SHORT STATEMENT OF THE INVENTION

Accordingly, this invention relates to a self contained method and apparatus for converting an electrical representation of a sensed condition to a pneumatic signal. A fluid under pressure drives a turbine which in turn drives an AC generator. The output of the generator is converted to a DC voltage of constant amplitude, and is coupled via a modulator circuit to a force coil fixedly secured to a force bar. The output of a sensing device modulates the current passing through the force coil. The force coil is positioned proximate a magnet so that the current passing through the coil generates a flux field that co-acts with the field of the magnet to attract the force bar. A portion of the fluid under pressure is channelled through an orifice to a readout or display device, with a portion of the channelled fluid being diverted to a bleeder line which is terminated in an orifice proximate the force bar and to a feedback bellows which acts on the force bar. As the force bar moves with respect to the orifice due to the current passing through the force coil and the pressure applied to the feedback bellows, the pressure of the channelled fluid varies thereby giving a readout that varies in accordance with the sensed condition.

BRIEF DESCRIPTION OF THE DRAWINGS

Other objects, advantages and features of this invention will be more fully appreciated from the following detailed description, appended claims and accompanying drawings in which:

DETAILED DESCRIPTION OF THE PREFERRED EMBODIMENT

Figure 1:
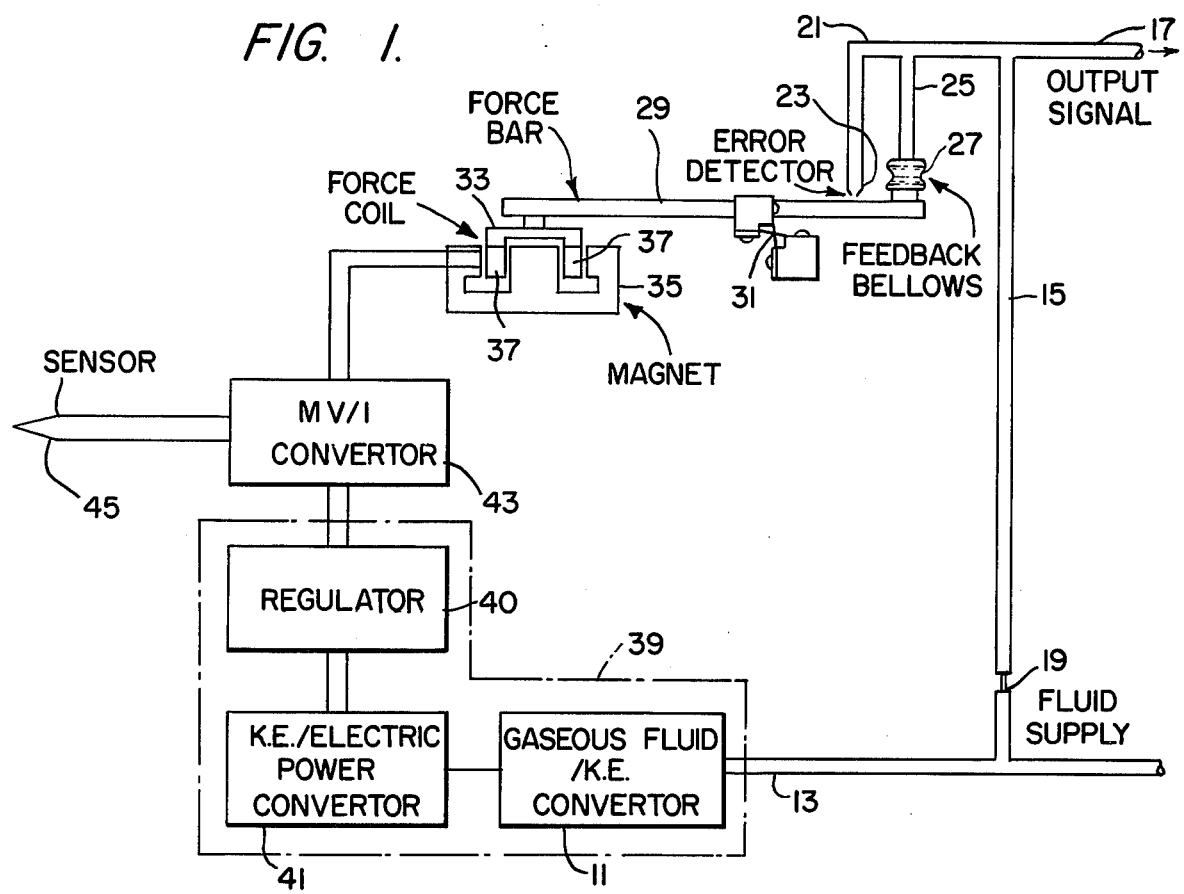
FIG. 1 is a schematic diagram of the pneumatic transmitter of this invention.
Figure 8:
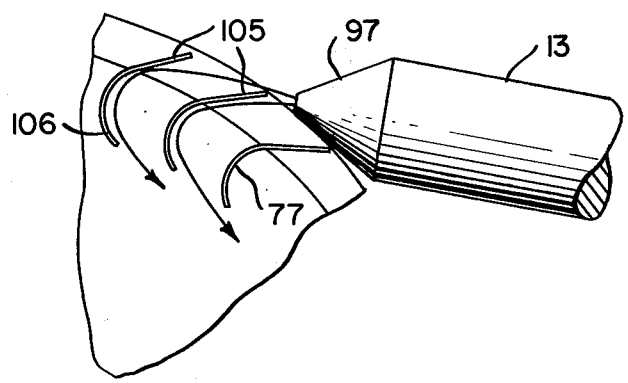
FIG. 8 is a partial view showing the configuration of the turbine blades and the pneumatic nozzle.

Refer now to FIG. 1 where there is shown a schematic block diagram of an apparatus for converting an electrical representation of a sensed physical condition to a fluid signal. A source of fluid such as gas under pressure is coupled to a fluid-to-kinetic energy converter 11 by means of a line 13, the converter 11 in the preferred embodiment being a turbine motor. The fluid may be derived from any suitable secondary source such as a gas or liquid line which is conveniently available. The line 13 is terminated at the turbine 11 in a nozzle as is best illustrated in FIg. 8. A branch line 15 is connected at one end to the main line 13 and at the other end thereof to an output line 17. A portion of the fluid under pressure is channelled through the branch line 15 to the output line 17 and then to a utilization or readout device (not shown) in which line 17 is terminated. An orifice 19 is placed in branch line 15 and co-acts with variable orifice 23 to provide variations in pressure to a utilization or readout device. A bleeder line 21 is connected at one end thereof to the junction of fluid lines 15 and 17 with the other end of the bleeder line 21 being terminated in the orifice 23. Intermediate orifice 23 and the junction of lines 15 and 17, there is connected a feedback line 25 which is terminated at a feedback bellows 27 which is responsive to variations of pressure in line 15. Each of the aforementioned lines are in the form of conduits and may be of any suitable material and may have any suitable diameter that is consistent with the type fluid being transmitted and the desired pressure level thereof.

A force bar 29 is mounted for rotational movement about a pivot point 31 with one end of the bar being coupled to feedback bellows 27 and the other end thereof being terminated in a force coil 33. The force bar is positioned so that the end thereof attached to the bellows 27 is proximate the orifice 23 of bleeder line 21. Thus, relative movement of the bar 29 with respect to the orifice 23 results in a change of the pressure level of the fluid being bled from branch line 15 through bleeder line 21 and orifice 23.

The force coil is a single coil mounted at the end of the force bar which extends into an annular space formed by the central core and outer ring of a magnet. In order to provide an electrical current to the force coil 37, a method and apparatus generally designated by the numeral 39 is provided for converting the pneumatic pressure of the fluid to a constant DC voltage. As aforementioned, a turbine 11 is provided for converting the pneumatic pressure of the fluid to rotational kinetic energy. In turn the turbine 11 drives a kinetic energy-to-electrical energy converter 41 in the form of an AC generator. The output of the generator 41 is an AC voltage, preferably in the form of a square wave which is rectified efficiently to give a DC voltage. Both turbine 11 and the generator 41 will be discussed in greater detail hereinbelow.

The DC output of generator 41 is regulated by regulator 40. The output of regulator 40 is connected to a millivolt-to-current converter 43 which in its simplest form may be an emitter-follower circuit which, as is well known, acts as a current amplifier. A more sophisticated converter will be described hereinbelow which will provide the long term stability required for monitoring environmental conditions over a continuous and long period of time. The millivolt-to-current convertor modulates the output current of the generator 41 in accordance with a signal provided by a sensor 45 which may take the form of a thermocouple, a resistance bulb or any one of a number of other appropriate sensing devices for detecting physical conditions. It should be understood that the sensing device 45 may modulate a signal being coupled thereto such as in a Hall Effect device or may generate its own signal such as in a thermocouple. In addition, the output of the sensing device may take the form of a variable DC signal, a pulse signal or a signal having a frequency which varies in accordance with the detected environmental condition. If the sensor requires excitation power, this may be furnished from the output of generator 41.

In operation fluid from a suitable source is transmitted via line 13 to turbine 11. The fluid under pressure forces the turbine wheel shaft to rotate thereby converting the fluid energy to rotational kinetic energy. The output of the turbine 11 drives the rotor of generator 41 which thereby generates an AC signal preferably having a square wave configuration. The square wave output of the generator is rectified and regulated to give a constant DC voltage. A physical condition such as temperature is detected by the sensing device 45 which provides an electric signal representing the detected physical condition. The output of the sensing device 45 is coupled to the voltage-to-current convertor 43. Convertor 43 modulates the generated DC current in accordance with the output of the sensor. The modulated current is conducted through the force coil 37. This current generates a flux field which interacts with the field of permanent magnet 35 causing a force upon coil 37 that is proportional to the current. Since coil 37 is fixedly secured to force bar 29, the force acting on the coil produces a moment about pivot point 31. This moment produces an angular displacement of the force bar which is proportional to the angular compliance of the force bar system. This displacement relative to fixed orifice 23 varies the pressure in feedback bellows 27. The pressure in feedback bellows 27, which acts on the effective area of the bellows, produces a moment about pivot point 31 which opposes the moment produced by the force acting on coil 37. Therefore, the force bar system is self-balancing and the fluid pressure produced in lines 15, 17, 21, and 25 is proportional to the sensed physical condition. It should be understood that while a rotational force bar has been shown for varying the pressure in line 17 in accordance with a sensed signal, any suitable means such as a laterally movable bar could be used to achieve the same result.

Figure 7:
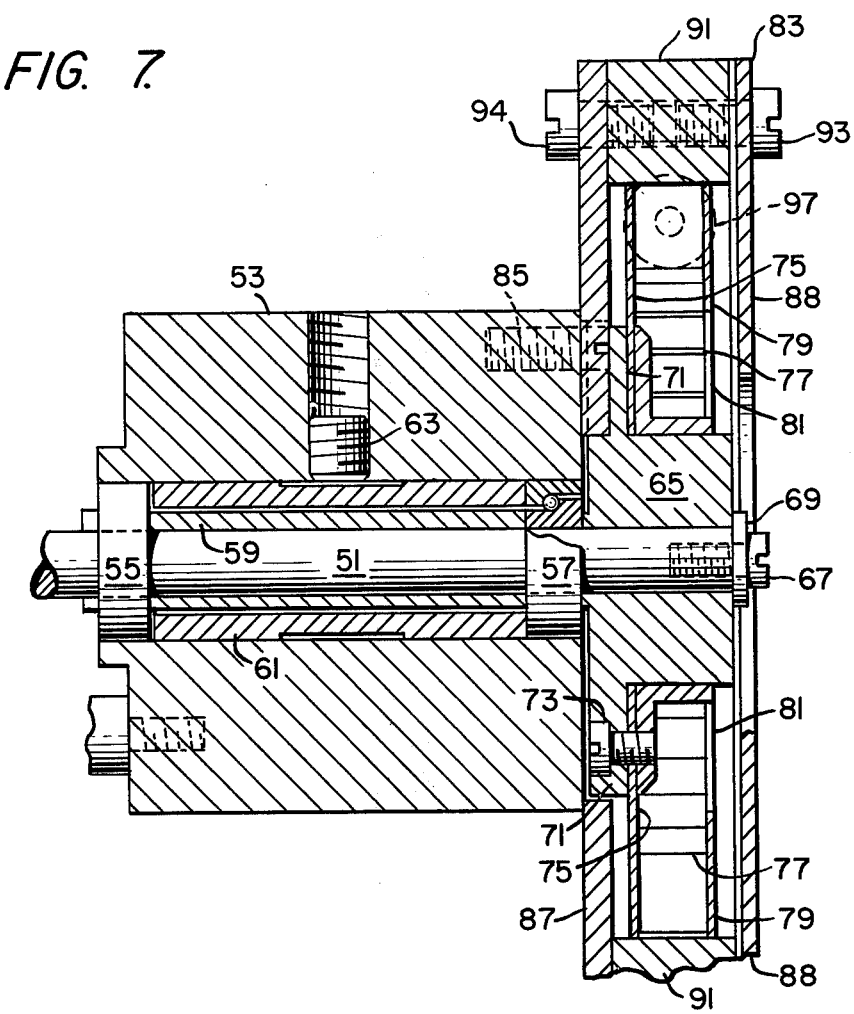
FIG. 7 is a cross sectional view of the turbine generator of this invention.

Refer now to FIG. 7 which is a section view of the turbine 11. As shown, a turbine shaft 51 is positioned in a cylindrical frame 53. A pair of ball bearings 55 and 57 are positioned at each end of the frame 53 through which the turbine shaft rotates. The bearings permit relatively frictionless rotational movement of the turbine shaft in the frame. The outer race of each ball bearing is secured to the frame with the inner race thereof being secured to the shaft 51. Intermediate the bearings 55 and 57 are sleeves 59 and 61 which provide axial positioning of the bearings and the rotating assembly.

Secured to one end of the shaft 51 is a hub 65 with the hub being secured to the shaft by means of a bolt 67 and washer 69. The hub 65 has a flange portion 71 to which is secured a turbine side wall 75 by means of a plurality of bolts 73. The side wall 75 is in the form of an annular plate having a hole through the center thereof the size of the base portion of the hub 65. To the side wall 75 are secured the buckets or blades of the turbine which are designated by the numeral 77. On the opposite side of the buckets from plate 75 is a second turbine plate 79 which may be secured to the turbine buckets by any one of a number of means well known in the art. The side wall 79 is in the form of an annular plate with the hole through the center thereof being somewhat larger than the diameter of the flange portion 71 of the hub 65. This permits the fluid being directed against the buckets to pass inwardly toward the center of the turbine wheel, formed by the hub 65, side walls 75 and 79 and buckets 77, and out through the opening designated by the numeral 81. A casing 83 is provided about the turbine wheel. The casing 83 includes a first annular wall 87 which is secured to the frame by means of a plurality of screws 85. A second annular wall 88 having a central hole therethrough which is somewhat smaller than the hole in the external side wall 79 of the turbine wheel is positioned on the opposite side of the turbine wheel from wall 87. Wall 87 is spaced with respect to wall 88 by means of a cylindrical spacer element 91. The spacer element completely surrounds the turbine wheel thereby preventing air or external elements from striking the buckets of the turbine wheel. A plurality of pairs of screws 93 and 94 secure the external wall 88 to the spacer 91 and the spacer 91 to the internal wall 87, respectively. A nozzle 97 is shown having its orifice facing generally perpendicular to the plane of the drawing so that fluid under pressure is directed against the buckets of the turbine wheel. At the opposite end of shaft 51 is connected the rotor 101 of the AC generator which is driven by the turbine shaft.

Refer now briefly to FIG. 8 which is a simplified illustration of the buckets or blades 77 of the turbine wheel. As aforementioned, the buckets are mounted between the spaced annular side plates 75 and 79 with plate 75 being connected rigidly to the hub 65 of the turbine generator. The nozzle stream from nozzle 97 is confined between these plates and is directed toward the axis of rotation of the turbine wheel. It has been found that a maximum impulse or driving torque can be obtained from buckets having a straight section 105 followed by a fairly large radius section 106 which curves to give as nearly as possible a full 180° reversal of the nozzle stream direction as shown. Instead of the turbine wheel construction described in connection with FIGS. 7 and 8, a simple toothed rotor wheel can be used wherein the teeth have flat faces which intercept the nozzle stream. Such a simplified rotor construction would permit a substantial economy of manufacture. However, for this type of turbine wheel, the change in direction of the flow of fluid from the nozzle to the turbine is only 90° and this results in less efficiency of the turbine motor than that afforded the generator illustrated in FIGS. 7 and 8.

Adequate channel space between the outer periphery of the turbine wheel and the casing can be provided for the flow of the accumulation of liquid, dirt or scum. One or more discharge holes can be positioned about the periphery of the casing in the spacer element 91. The liquid, dirt or scum can therefore exit through the holes under the force of gravity and with the leakage flow of air or gas due to the centrifugal pressure gradient within the casing which is at a maximum at the outside diameter of the casing.

Figure 2:
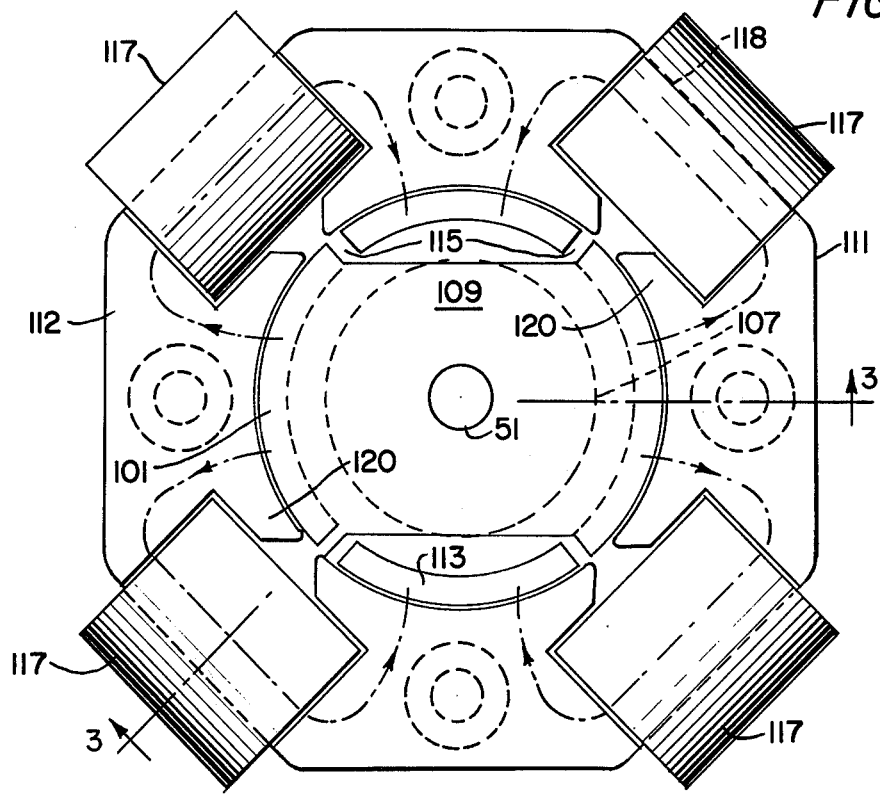
FIG. 2 is a simplified plan view of the AC generator of this invention.

Now refer to FIG. 2 where there is shown a plan view of the AC generator of this invention. As shown in dotted lines, a permanent magnet 107 is mounted on the turbine shaft 51 which extends from the turbine. The magnet 107 is rigidly secured to shaft 51 by any one of a number of means well known in the art. The magnet is magnetized so that its north and south poles extend in a line parallel with the longitudinal axis of the shaft 51. The magnet 107 is surrounded by soft iron pole shoes 109 and 113 as shown in the drawings. The north pole shoe 109 has a U-shaped configuration with the sides thereof having a generally cylindrical configuration to conform to the external periphery of magnet 107 and the inner periphery of stator 111. The south pole shoe 113 also has a U-shaped configuration with the sides thereof extending upward between the sides of the north pole shoe 109. As in the case of the north pole shoe, the south pole shoe has sides which are cylindrical in shape so as to conform to the outside periphery of permanent magnet 107 and the inside periphery of stator 111.

Mounted about the external periphery of the rotor is a stator core 111 which is formed of a plurality of laminations of a magnetic material. Mounted on the stator core are four windings 117 which are connected in series such that the voltages generated in each winding add. Each of the windings 117 is positioned an equal distance away from each other about the stator core and each winding includes a bobbin with layers of conductor turns wrapped thereabout. The windings surround the paths of flux in stator 111. The windings 117 may be wound by any suitable technique known in the art. The windings are located on the external arms 118 rather than internal radially oriented arms thereby providing an easier method of constructing the stator. As shown, the pole pieces 120 of the stator each have an arcuate face portion which corresponds to the external periphery of the shoes 109 and 113 of the rotor. The air gap between the rotor and stator is thereby minimized so as to provide a more efficient operation of the generator. Further the face portions of the stator extend almost entirely around the external periphery of the rotor to thereby substantially reduce the possibility that the rotor will "lock" should the turbine stall.

Figure 3:
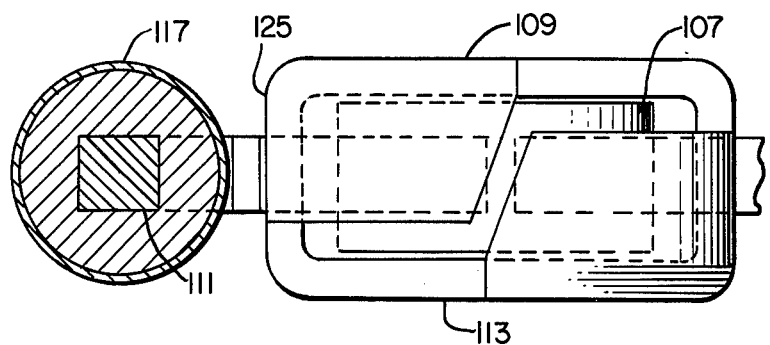
FIG. 3 is a partial section view of the generator of FIG. 2 taken along the lines 3—3 thereof.

Refer now to FIG. 3 where there is shown a partial view of the generator of FIG. 2 taken along the lines 3—3 thereof. The north pole shoe 109 is shown having its side portion 125 extending downward over the permanent magnet 107. The south magnetic pole is shown having its side portion extending upward over magnet 107 as illustrated. The edges of the shoes are inclined, as shown, to smooth the change in the flux as the edges pass over the small gaps in the stator, between pole pieces 120, further reducing the possibility of "locking." The stator core 111 is positioned externally of the shoes 109 and 113 with the core having a winding 117 wrapped thereabout for inducing an electrical current in the winding in response to the flux field passing through the core 111. The core has a substantially square cross section as it passes through the windings 117. This provides a very efficient coupling of flux with the windings.

Figure 4:
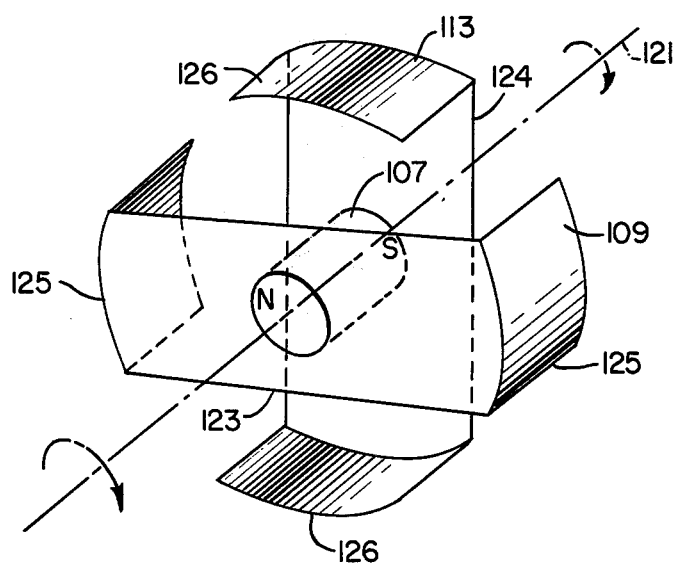
FIG. 4 is a simplified representation of the rotor structure of the generator of this invention.

FIG. 4 shows in schematic form the arrangement of the shoes 109 and 113 with respect to the permanent magnet 107 of the rotor. The magnet 107 is aligned with the longitudinal axis 121 of the turbine shaft 51, the north and south poles thereof being parallel with the axis 121. The north pole shoe 109 is shown having an upper plate portion 123 and two side portions 125. Each side portion extends from the upper plate portion 123 toward the plate portion 124 of the south pole 113. Each arm portion 125 has a curved surface to conform both to the curvature of magnet 107 and to the internal periphery of the stator core 111. The south magnetic pole shoe 113 is secured to the south pole of the permanent magnet 107 and has a pair of side portions 126 extending from the plate portion 124 thereof toward the north pole of the magnet 107. The arm portions 126 have a generally curved surface to conform to the internal periphery of the stator core 111. In the preferred embodiments, the sides 125 and 126 extend over a greater arc length than illustrated in the figure thereby leaving a relatively small gap between the sides of the arms. The increased area of the shoes 109 and 113 facing the stator 111 provided by the greater arc length, decreases starting torque and its accompanying inefficiencies.

In operation as the turbine shaft 51 rotates, permanent magnet 107 and hence shoes 109 and 113 rotate within the stator core 111. The field from the permanent magnet passes through the shoes 109 and 113 and through core 111 thereby inducing current in the windings 117. It should be noted that by using a permanent magnet in the rotor the need for a commutator in the rotor is obviated thereby substantially simplifying the structure of the generator and insuring that with fewer parts the generator will have a longer life. This is particularly important where the generator will be used continuously over a long period of time in an area which will be inspected only at infrequent time intervals.

Figure 5:
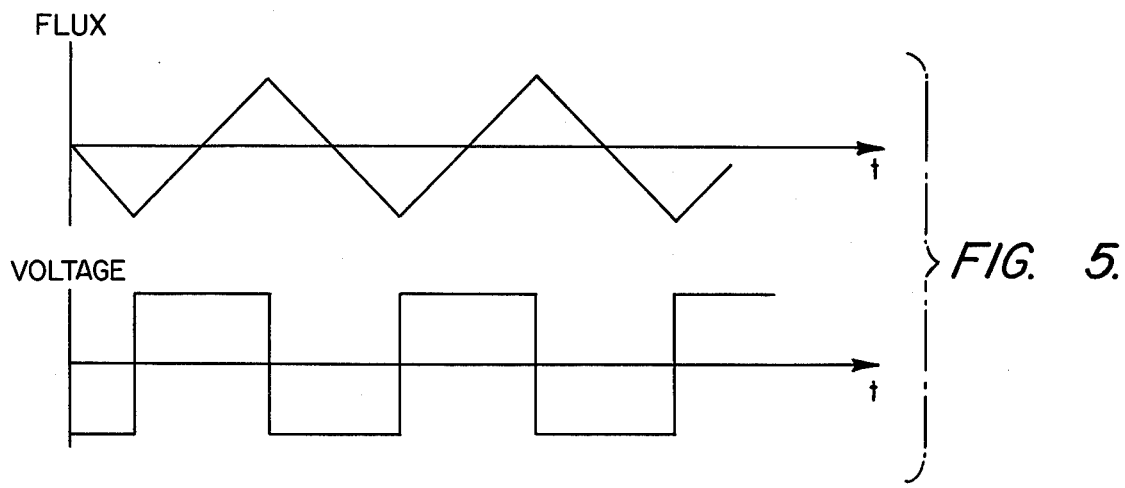
FIG. 5 is a graphical display of the flux and voltage waveforms associated with the generator of FIGS. 2–4.

When the rotor is positioned as shown in FIG. 2 the magnetic field of permanent magnet 107 passes through the north magnetic pole shoe 109, through core 111 and through the windings 117 in the direction shown in the drawings and then back to the permanent magnet through the south pole shoe 113. As aforementined, each of the windings 117 are connected such that the voltage induced therein is added. When the rotor moves 45° in a counter-clockwise direction, no flux will link the windings 117 since the core 111 to each side of the windings 117 will be of the same magnetic polarity. When the rotor rotates an additional 45° or a total of 90° from the position shown in FIG. 2, the current generated in the windings 117 is reversed since the direction of flux through the coil is reversed. Since the rate of change of flux through the coils is quite uniform in the generator illustrated in FIGS. 2–4, a triangular waveform such as shown in FIG. 5 is generated. With such a flux waveform, the voltage generated in the windings is a square wave such as shown in FIG. 5. Such a waveform is desirable since once rectified it provides a substantially uniform DC voltage without requiring a large low pass filter and hence the loss of electrical energy during the rectification process is minimized.

The output of the generator is rectified by a suitable full wave rectifier and regulated by an efficient voltage regulator. The rectifier and regulator circuits are not described in detail because such circuits are well-known in the art.

Figure 6:
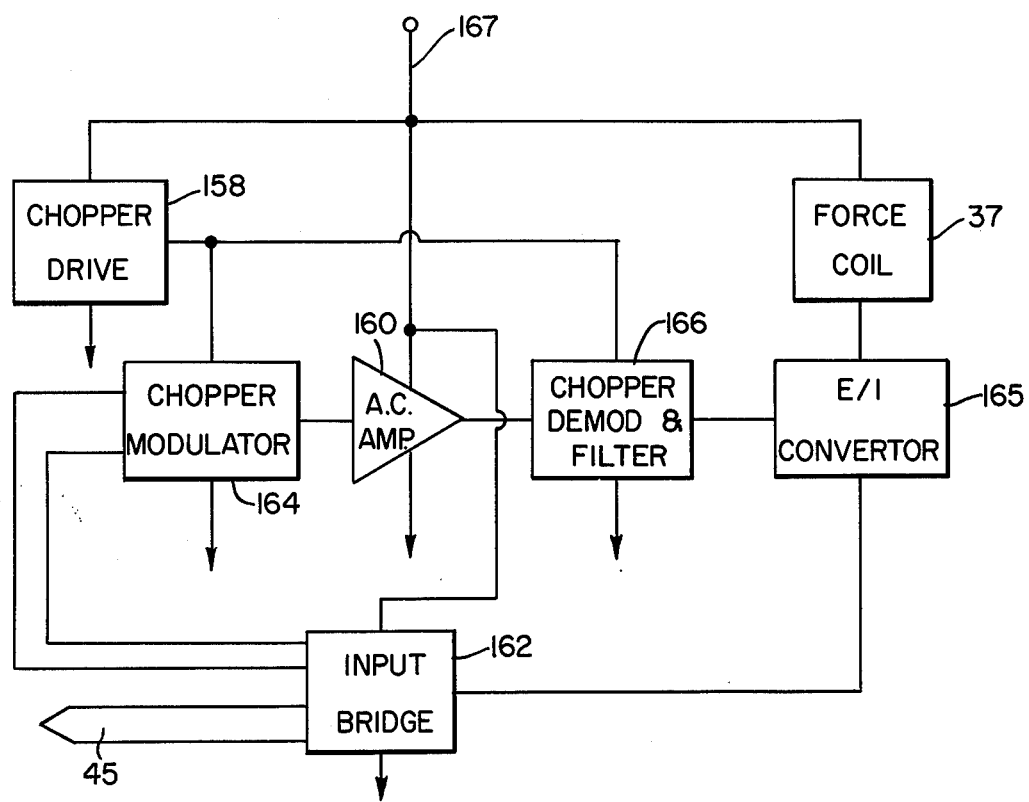
FIG. 6 is a block diagram of the convertor for modulating the generated DC signal in accordance with a sensed environmental condition.

Refer now to FIG. 6 where there is shown a schematic diagram of the preferred embodiment of the voltage-to-current convertor. The output terminal 167 of the generator is connected to a chopper drive circuit 158, the force coil 37, an AC amplifier 160 and an input bridge 162. One arm of the input bridge is coupled to the sensing element which may be, for example, a thermocouple. Changes in the output of the sensor alter the balance of the bridge thereby producing a variable output signal at the output of the bridge. The output of the bridge is connected to the input of a chopper modulator 164 driven by chopper drive 158. Chopper drive circuits and modulators are well known in the art and, therefore are not illustrated herein in detail. The output of the modulator 164 which is an AC or chopped version of the bridge output is amplified by AC amplifier 160 and then demodulated by chopper demodulator and filter 166. Demodulator 166 is synchronized by the chopped DC signal from the chopper drive circuit 158. By chopping and amplifying the sensed signal, long term stability can be achieved with problems of drift well known in DC systems thereby being eliminated. The demodulated signal is filtered to remove high frequency components, such as spikes, which were generated during the demodulating step.

The output of chopper demodulator 166 is connected to the control input of an E/I convertor 168 which in the preferred embodiment is a simple current amplifier. Thus, for example, convertor 168 may take the form of a Darlington common emitter which is well known in the art. As the input to the convertor 168 varies in accordance with the environmental condition being sensed the current flow therethrough from the generator 41 varies. Hence, the current flow through the force coil 37 is varied. As aforementioned, variable current flow through the coil 37 causes a corresponding change in flux generated by the coil thereby causing a movement of force bar 29 that varies with the sensed physical condition. Such movement of the force bar 29 alters the pressure level in line 17 thereby providing a variable pressure which may be transmitted via line 17 to a readout device or to a utilization device which may control the environment being sensed.

An important feature of the invention is the fact that each of the components with the exception of transducer 45 is contained within a single enclosure. Accordingly, if the generator 41 or turbine 11 should become overheated, the surrounding environment will be shielded therefrom. Thus, the possibility of igniting volatile gases or liquids which may surround the system is reduced. Another important feature of the invention is that the system can be isolated from ground potential since the system is self contained. Thus, large ground currents due to high potentials on pipes, furnaces and other equipment to which the transducer may be attached will not pass through the system of this invention.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

We claim:

1. An apparatus for converting an electrical signal for the fluid transmission thereof comprising: a source of fluid under pressure, means for converting the energy of said fluid to electrical energy, said electrical energy being in the form of a DC current, means for sensing a physical condition and for generating an electrical signal representative thereof, means for modulating said DC current in accordance with said electrical signal representative of said sensed condition, conduit means for channelling off a portion of said fluid at said source, said channelled fluid having an input pressure and output pressure, and means for varying the output pressure of said channelled fluid in accordance with said modulated electrical current.

2. The apparatus of claim 1 wherein said means for varying the pressure of said channelled fluid in accordance with said modulated electrical current comprises: variable orifice means for bleeding off a portion of said channelled fluid, orifice means for limiting flow of said channelled fluid, lever means positioned proximate said variable orifice means, and electromagnetic means responsive to said modulated electrical current for moving said lever means with respect to said variable orifice means in accordance with said electrical signal representative of said sensed physical condition.

3. The apparatus of claim 2 wherein said means for converting the energy of said fluid under pressure to electrical energy comprises: means for converting the energy of said fluid under pressure to rotational kinetic energy, and means for converting said rotational kinetic energy to electrical energy, said electrical energy being in the form of a DC current.

4. The apparatus of claim 3 wherein said means for converting the energy of said fluid under pressure to rotational kinetic energy is a turbine motor and wherein said means for converting said rotational kinetic energy to electrical energy is an AC generator.

5. The apparatus of claim 4 further comprising: means for rectifying the output of said generator, and means for regulating said rectified output.

6. The apparatus of claim 2 further comprising: feedback means responsive to the movement of said lever for returning said lever to its original position.

7. The apparatus of claim 6 wherein said feedback means comprises a bellows secured at one end to said lever means.

8. The apparatus of claim 4 wherein said generator comprises a stator having an annular core and at least one winding thereabout, and a rotor, said rotor including a permanent magnet having its north and south poles aligned with the axis of rotation thereof, and a pair of soft iron shoes positioned at each end of said magnet, said shoes having side portions proximate the inner periphery of said stator core.

9. The apparatus of claim 8 wherein said stator has four windings spaced equidistantly about said stator core, and wherein the side portions of said rotor shoes interleave proximate the inside periphery of said stator.

10. An apparatus for using electrical power in monitoring a physical condition at a location along a conduit for the transport of fluid where electrical power is not otherwise available, said apparatus comprising means for sensing said physical condition and for generating an electrical signal representative thereof; means for converting energy of fluid in said conduit to electrical energy, said electrical energy being used only to supply power to said sensing and generating means; means for forming an output electrical signal related to said representative electrical signal; means for channeling off a portion of the fluid in said conduit for transport of fluid, said channeled fluid having an input pressure and an output pressure; and means for varying the output pressure of said channeled fluid in accordance with said output electrical signal.

11. The apparatus of claim 10 wherein said means for varying the output pressure of said channelled fluid comprises: orifice means for limiting the flow of said channelled fluid from the conduit for transport of fluid, variable orifice means for bleeding off a portion of said channelled fluid, lever means positioned proximate said variable orifice means, and electromagnetic means responsive to said output electrical signal for moving said lever means with respect to said variable orifice means in accordance with said output electrical signal.

12. A method for using electrical power in monitoring a physical condition at a location along a conduit for transport of a fluid where electrical power is not otherwise available, said method comprising the steps of: sensing said physical condition and generating an electrical signal representative thereof; converting energy of fluid in said conduit to electrical energy, said electrical energy being used to supply power only to said sensing and generating means; forming an output electrical signal related to said representative electrical signal; channeling off a portion of the fluid in said conduit for transport of fluid, said channeled fluid having an input pressure and an output pressure; and varying the output pressure of said channeled fluid in accordance with said output electrical signal.

13. A method for using electrical power in monitoring a physical condition at a location along a conduit for transport of a fluid where electrical power is not otherwise available, said method comprising the steps of: sensing said physical condition and generating an electrical signal representative thereof; converting energy of fluid in said conduit to electrical energy, said electrical energy being used to supply power only to said sensing and generating means, forming an output electrical signal related to said representative electrical signal; and varying in accordance with said output signal the pressure of a fluid stream conveyed through a second conduit by bleeding off through an orifice a portion of said fluid stream and moving a lever means with respect to said orifice in accordance with said output signal related to said sensed physical condition.

14. The method of claim 13 wherein the step of converting the energy of said fluid to electrical energy comprises the steps of: converting the energy of said fluid to rotational kinetic energy, and converting said rotational kinetic energy to electrical current.

15. The method of claim 14 further comprising the steps of: rectifying said generated electrical current, and regulating said rectified electrical current.

* * * * *